US012744283B2

(12) United States Patent
Park et al.

(10) Patent No.: US 12,744,283 B2
(45) Date of Patent: Sep. 22, 2026

(54) SEPARATOR INCLUDING POROUS POLYMER SUBSTRATE AND POROUS COATING LAYER CONTAINING INORGANIC PARTICLES AND BINDER POLYMER, AND METHOD FOR MANUFACTURING THE SAME

(71) Applicant: LG ENERGY SOLUTION, LTD., Seoul (KR)

(72) Inventors: Jun-Soo Park, Daejeon (KR); Bum-Young Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 673 days.

(21) Appl. No.: 18/020,498

(22) PCT Filed: Sep. 6, 2021

(86) PCT No.: PCT/KR2021/012067
§ 371 (c)(1),
(2) Date: Feb. 9, 2023

(87) PCT Pub. No.: WO2022/050801
PCT Pub. Date: Mar. 10, 2022

(65) Prior Publication Data

US 2023/0268615 A1 Aug. 24, 2023

(30) Foreign Application Priority Data

Sep. 7, 2020 (KR) ........................ 10-2020-0113902

(51) Int. Cl.
*H01M 50/446* (2021.01)
*H01M 4/62* (2006.01)
(Continued)

(52) U.S. Cl.
CPC ......... *H01M 50/446* (2021.01); *H01M 4/623* (2013.01); *H01M 10/0525* (2013.01);
(Continued)

(58) Field of Classification Search
CPC ............. H01M 50/446; H01M 50/403; H01M 50/461; H01M 50/449; H01M 4/623; H01M 10/0525
(Continued)

(56) References Cited

U.S. PATENT DOCUMENTS

2003/0035995 A1 2/2003 Ohsaki et al.
2006/0216608 A1 9/2006 Ohata et al.
(Continued)

FOREIGN PATENT DOCUMENTS

CN 109314207 A 2/2019
CN 111373572 A 7/2020
(Continued)

OTHER PUBLICATIONS

"Slope." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1291471. (Year: 2010).*
(Continued)

*Primary Examiner* — Sean P Cullen
(74) *Attorney, Agent, or Firm* — Birch Stewart Kolasch & Birch, LLP

(57) ABSTRACT

A separator for an electrochemical device and a method for manufacturing the same. Particularly, the drying rate of a composition for forming a second porous coating layer is controlled to be higher than the drying rate of a composition for forming a first porous coating layer. In this manner, it is possible to improve the interfacial adhesion between an electrode and the separator, while ensuring adhesion
(Continued)

strength between a porous polymer substrate and a porous coating layer.

7 Claims, 2 Drawing Sheets

(51) Int. Cl.
*H01M 10/0525* (2010.01)
*H01M 50/403* (2021.01)
*H01M 50/449* (2021.01)
*H01M 50/46* (2021.01)

(52) U.S. Cl.
CPC ....... *H01M 50/403* (2021.01); *H01M 50/449* (2021.01); *H01M 50/461* (2021.01)

(58) Field of Classification Search
USPC ......................................... 429/144, 251, 254
See application file for complete search history.

(56) References Cited

U.S. PATENT DOCUMENTS

| | | | | |
|---|---|---|---|---|
| 2008/0292968 | A1 | 11/2008 | Lee et al. | |
| 2011/0206973 | A1* | 8/2011 | Brant | H01M 50/494 264/45.1 |
| 2012/0090758 | A1 | 4/2012 | Lee et al. | |
| 2013/0302661 | A1 | 11/2013 | Kim et al. | |
| 2014/0322586 | A1 | 10/2014 | Lee et al. | |
| 2016/0228051 | A1 | 8/2016 | Lee et al. | |
| 2017/0117525 | A1 | 4/2017 | Suzuki | |
| 2017/0229698 | A1* | 8/2017 | Mizuno | H01M 50/417 |
| 2019/0020008 | A1 | 1/2019 | Kim et al. | |
| 2019/0036105 | A1 | 1/2019 | Park et al. | |
| 2019/0131604 | A1 | 5/2019 | Yoon et al. | |
| 2019/0319239 | A1 | 10/2019 | Zhou | |
| 2020/0203694 | A1 | 6/2020 | Yun et al. | |
| 2021/0175583 | A1 | 6/2021 | Shin et al. | |
| 2021/0184309 | A1 | 6/2021 | Kwon et al. | |
| 2021/0280945 | A1 | 9/2021 | Kim et al. | |

FOREIGN PATENT DOCUMENTS

| | | | |
|---|---|---|---|
| EP | 2 806 483 | A1 | 11/2014 |
| JP | 8-50893 | A | 2/1996 |
| JP | 9-147834 | A | 6/1997 |
| JP | 2004-95538 | A | 3/2004 |
| JP | 2011-210478 | A | 10/2011 |
| JP | 2013-201039 | A | 10/2013 |
| JP | 2014-107182 | A | 6/2014 |
| JP | 2015-524991 | A | 8/2015 |
| JP | 2015-173035 | A | 10/2015 |
| JP | 2016-72155 | A | 5/2016 |
| JP | 2016-181357 | A | 10/2016 |
| KR | 10-2006-0024390 | A | 3/2006 |
| KR | 10-0727247 | B1 | 6/2007 |
| KR | 10-2012-0000708 | A | 1/2012 |
| KR | 10-2013-0126445 | A | 11/2013 |
| KR | 10-1707193 | B1 | 2/2017 |
| KR | 10-2018-0028984 | A | 3/2018 |
| KR | 10-2019-0079544 | A | 7/2019 |
| KR | 10-2017568 | B1 | 9/2019 |
| KR | 10-2016717 | B1 | 10/2019 |
| KR | 10-2019473 | B1 | 11/2019 |
| KR | 10-2061247 | B1 | 12/2019 |
| KR | 10-2019-0067124 | A | 6/2026 |
| WO | WO 2018/003979 | A1 | 1/2018 |
| WO | WO 2020/044612 | A1 | 3/2020 |
| WO | WO 2020/067778 | A1 | 4/2020 |

OTHER PUBLICATIONS

"Gradient." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1251738. (Year: 2010).*

International Search Repori (PCT/ISA/210) issued in PCT/KR2021/012067 mailed on Jan. 3, 2022.

Extended European Search Report for European Application No. 21864759.2, dated May 12, 2025.

* cited by examiner

SEPARATOR INCLUDING POROUS POLYMER SUBSTRATE AND POROUS COATING LAYER CONTAINING INORGANIC PARTICLES AND BINDER POLYMER, AND METHOD FOR MANUFACTURING THE SAME

TECHNICAL FIELD

The present application claims priority to Korean Patent Application No. 10-2020-0113902 filed on Sep. 7, 2020 in the Republic of Korea, the disclosures of which are incorporated herein by reference.

The present disclosure relates to a separator for an electrochemical device and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although electrochemical devices, such as lithium secondary batteries, have been produced from many production companies, safety characteristics thereof show different signs. Evaluation and securement of safety of such electrochemical devices are very important.

Meanwhile, 'overcharge' refers to the behavior of continuing to charge a cell to a level beyond the upper cut-off voltage (e.g. 4.2-4.3 V) in a certain charging process so that the cell may exceed the normal capacity thereof. Herein, side reactions occur in the electrodes, electrolyte, or the like, in the cell to cause an increase in internal temperature of the cell, resulting in shrinking of the separator and an internal short-circuit. Due to the momentary short-circuit generated herein, the cell temperature is increased rapidly and reactions may occur with combustible gases inside of the cell, resulting in explosion. Such a rapid increase in cell temperature is further amplified due to the low heat conductivity of the cell.

To solve the above-mentioned problem, a pad or foil having high heat conductivity has been introduced to the cell surface according to the related art. In this manner, heat-radiating capability (heat-releasing capability) is improved to reduce such a rapid increase in temperature. However, the method cannot satisfy high energy density required for the cell for vehicles currently. This is because when introducing the pad or the foil, the energy density per unit volume is reduced.

Therefore, there is a need for a cell which has enhanced heat-radiating property, while maintaining the conventional energy density.

DISCLOSURE

Technical Problem

The present disclosure is designed to solve the problems of the related art, and therefore the present disclosure is directed to providing a separator for an electrochemical device which can provide improved overcharge safety without using any additional device.

The present disclosure is also directed to improving the heat-radiating property of a cell to provide the cell with improved safety, while maintaining the conventional energy density.

Technical Solution

In one aspect of the present disclosure, there is provided a separator for an electrochemical device according to any one of the following embodiments.

According to the first embodiment, there is provided a separator for an electrochemical device including:

a porous polymer substrate; and a porous coating layer on at least one surface of the porous polymer substrate wherein the porous coating layer includes inorganic particles and a binder polymer, wherein the porous coating layer includes a first region that is in contact with the porous polymer substrate and a second region on the opposite side of the first region that is not in contact with the porous polymer substrate, wherein the binder polymer present in the first region and the second region has a concentration gradient increasing from the porous polymer substrate toward the outermost surface of the porous coating layer, and wherein the concentration gradient of the binder polymer present in the second region has a larger slope than the slope of the concentration gradient of the binder polymer present in the first region.

According to the second embodiment, there is provided the separator for an electrochemical device according to the first embodiment, wherein an amount of the binder polymer present in the first region is the same as an amount of the binder polymer present in the second region.

According to the third embodiment, there is provided the separator for an electrochemical device according to the first or the second embodiment, wherein the ratio of the thickness of the first region to the thickness of the second region is 4:6-1:9.

According to the fourth embodiment, there is provided the separator for an electrochemical device according to any one of the first to the third embodiments, wherein the binder polymer includes polyvinylidene fluoride (PVDF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, acrylonitrile-styrene-butadiene copolymer, polyimide, or two or more of them.

In another aspect of the present disclosure, there is provided an electrochemical device according to any one of the following embodiments.

According to the fifth embodiment, three is provided an electrochemical device which includes an electrode assembly in a battery casing including a positive electrode and a negative electrode; and a separator interposed between the positive electrode and the negative electrode, wherein the separator is the separator for an electrochemical device as defined in any one of the first to the fourth embodiments.

According to the sixth embodiment, there is provided the electrochemical device as defined in the fifth embodiment, wherein the porous coating layer faces the positive electrode.

According to the seventh embodiment, there is provided the electrochemical device as defined in the sixth embodiment, having an adhesion strength of 30 gf/25 mm or more at the interface between the separator and the positive electrode, wherein the adhesion strength is measured by heating and pressurizing the separator and the positive electrode at 80° C. under a pressure of 1000 kgf for 1 second, and then applying force at 180° and a rate of 100 mm/min.

In still another aspect of the present disclosure, there is provided a method for manufacturing a separator for an electrochemical device according to any one of the following embodiments.

According to the eighth embodiment, there is provided a method for manufacturing a separator for an electrochemical device, including the steps of:

(S1) preparing a first composition for forming a first porous coating layer and preparing a second composition for forming a second porous coating layer;

(S2) coating and drying the first composition for forming a first porous coating layer on at least one surface of the porous polymer substrate; and (S3) coating and drying the second composition for forming a second porous coating layer on a surface of the first porous coating layer, wherein the composition for forming a second porous coating layer is dried at a higher drying rate than the drying rate of composition for forming a first porous coating layer.

According to the ninth embodiment, there is provided the method for manufacturing a separator for an electrochemical device as defined in the eighth embodiment, wherein each of the drying rate of the composition for forming a first porous coating layer and the drying rate of the composition for forming a second porous coating layer is controlled to an amount of the solvent dried per second of 1-50 mg/sec, and the drying rate of the composition for forming a second porous coating layer is higher than the drying rate of the composition for forming a first porous coating layer.

According to the tenth embodiment, there is provided the method for manufacturing a separator for an electrochemical device as defined in the eighth or the ninth embodiment, wherein the drying rate of the composition for forming a second porous coating layer is higher than the drying rate of the composition for forming a first porous coating layer by 1-20 mg/sec.

According to the eleventh embodiment, there is provided the method for manufacturing a separator for an electrochemical device as defined in any one of the eighth to the tenth embodiments, wherein the drying rate of the composition for forming a first porous coating layer is 10-50% based on the drying rate of the composition for forming a second porous coating layer.

According to the twelfth embodiment, there is provided the method for manufacturing a separator for an electrochemical device as defined in any one of the eighth to the eleventh embodiments, wherein step (S1) is carried out by adding first inorganic particles to a first binder solution containing a first binder polymer dissolved in a first solvent and carrying out agitation to prepare a composition for forming a first porous coating layer containing the first inorganic particles dispersed therein, and adding second inorganic particles to a second binder solution containing a second binder polymer dissolved in a second solvent and carrying out agitation to prepare a composition for forming a second porous coating layer containing the second inorganic particles dispersed therein, wherein the composition for forming a first porous coating layer has the same composition as the composition for forming a second porous coating layer.

Advantageous Effects

According to an embodiment of the present disclosure, the binder polymer contained in the second region has a concentration gradient which increases toward an electrode based on the thickness direction of the separator and is larger than the concentration gradient of the binder polymer contained in the first region. Therefore, it is possible to provide increased adhesion between the electrode and the separator.

Since the adhesion between the electrode and the separator is increased, it is possible to provide enhanced overcharge safety. As a result, it is possible to enhance overcharge safety by using the existing separator with no additional device.

According to an embodiment of the present disclosure, the binder polymer contained in the first region has a smaller concentration gradient as compared to concentration gradient of the binder polymer contained in the second region. Therefore, it is possible to ensure adhesion strength at the interface between the porous polymer substrate and the porous coating layer.

According to an embodiment of the present disclosure, the adhesion between the separator and the positive electrode is increased in order to improve low heat conductivity between the positive electrode and the separator. When the adhesion between the positive electrode and the separator is low, the electrolyte interface layer impregnated between the positive electrode and the separator has an increased thickness, and thus the heat conductivity required for discharging the heat generated in the cell to the outside is reduced. On the contrary, the battery cell according to an embodiment of the present disclosure shows increased adhesion at the interface between the separator and the positive electrode, resulting in improvement of heat-radiating characteristics.

According to an embodiment of the present disclosure, the composition for forming a first porous coating layer and the composition for forming a second porous coating layer are coated sequentially, and the drying rate of the composition for forming a second porous coating layer is set to be higher than the drying rate of the composition for forming a first porous coating layer. In this manner, the migration of the binder polymer occurring in the composition for forming a second porous coating layer is controlled to be increased in such a manner that the binder is distributed abundantly on the surface of the porous coating layer facing the electrode. As a result, it is possible to increase the interfacial cohesion between the separator and the electrode.

In addition, according to an embodiment of the present disclosure, the composition for forming a first porous coating layer and the composition for forming a second coating layer having the same composition as the composition for forming a first coating layer are coated sequentially. Therefore, it is possible to ensure the interfacial cohesion between the porous polymer substrate and the porous coating layer.

BEST MODE

Figure 1:
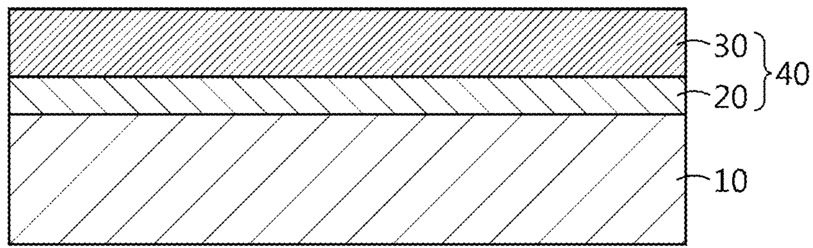
FIG. 1 is a schematic view illustrating the separator according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

When a cell is ignited by overcharge, the internal temperature of the cell is increased due to the side reactions of the internal elements forming the cell, caused by the overcharge current. As a result, the separator is shrunk to cause an internal short-circuit. Due to the momentary short-circuit generated herein, the cell temperature is increased rapidly and reactions may occur with combustible gases inside of the cell, resulting in explosion. Such a rapid increase in cell temperature is further amplified due to the low heat conductivity of the cell.

To solve the above-mentioned problem, a pad or foil having high heat conductivity has been introduced to the cell surface according to the related art. In this manner, heat-radiating capability (heat-releasing capability) is improved to reduce such a rapid increase in temperature. However, the method cannot satisfy high energy density required for the cell for vehicles currently. This is because when introducing the pad or the foil, the energy density per unit volume is reduced.

The inventors of the present disclosure have been conducted intensive studies to accomplish the above-mentioned objects, and have found that the portion having the highest heat resistance among the heat resistant elements of a cell is an electrode/separator interface, particularly, positive electrode/separator interface. Finally, the present disclosure is based on the point that it is required to increase the adhesion at the electrode/separator interface, particularly, positive electrode/separator interface in order to reduce the heat resistance at the interface.

In one aspect of the present disclosure, there is provided a separator for an electrochemical device including:

a porous polymer substrate; and a porous coating layer positioned on at least one surface of the porous polymer substrate and including inorganic particles and a binder polymer, wherein the porous coating layer includes a first region that is in contact with the porous polymer substrate and a second region positioned on the opposite side of the first region that is not in contact with the porous polymer substrate, each of the binder polymer contained in the first region and the second region has a concentration gradient increasing from the porous polymer substrate toward the outermost the porous coating layer, and the concentration gradient of the binder polymer contained in the second region has a larger slope than the slope of the concentration gradient of binder polymer contained in the first region.

According to the present disclosure, the porous polymer substrate is a porous membrane and can provide a channel for transporting lithium ions, while insulating the positive electrode and the negative electrode electrically from each other to prevent a short-circuit. Any material may be used with no particular limitation, as long as it may be used conventionally as a material for a separator of an electrochemical device.

Particularly, the porous polymer substrate may be a porous polymer film substrate or a porous polymer nonwoven web substrate.

The porous polymer film substrate may be a porous polymer film including polyolefin, such as polyethylene, polypropylene. Such a polyolefin porous polymer film substrate realizes a shut-down function at a temperature of 80-150° C.

Herein, the polyolefin porous polymer film substrate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web polymer substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

There is no particular limitation in the thickness of the porous polymer substrate, the porous polymer substrate may have a thickness of 1-100 μm, particularly 5-50 μm. As the batteries have been provided with high output/high capacity recently, it is advantageous to use a thin film as a porous polymer substrate.

The pores present in the porous polymer substrate may have a dimeter of 10-100 nm, 10-70 nm, 10-50 nm, or 10-35 nm, and a porosity of 5-90%, preferably 20-80%. However, according to the present disclosure, such numerical ranges may be changed with ease according to a particular embodiment, or as necessary.

The pores of the porous polymer substrate may include several types of pore structures. When any one of the pore size determined by using a porosimeter and the average pore size observed through field emission-scanning electron microscopy (FE-SEM) satisfies the above-defined range, it falls within the scope of the present disclosure.

Herein, in the case of a generally known monoaxially oriented dry separator, the median pore size in the pore size of the transverse direction (TD), not the pore size of the machine direction (MD), determined through FE-SEM may be taken as the standard pore size.

In the case of the other porous polymer substrates (e.g. wet polyethylene (PE) separator) having a network structure, the pore size measured by using a porosimeter may be taken as the standard pore size.

The porosity of the porous polymer substrate may be determined from scanning electron microscopic (SEM) images, a mercury porosimeter, capillary flow porosimeter, or through the BET 6-point method based on nitrogen gas adsorption flow using a porosimetry analyzer (e.g. Belsorp-II mini, Bell Japan Inc.).

The porous coating layer is coated in at least one region selected from at least one surface of the porous polymer substrate and the pores of the porous polymer substrate, and comprises both inorganic particles and a binder polymer. The porous coating layer may be disposed on both surfaces of the porous polymer substrate or disposed selectively on merely one surface of the porous polymer substrate.

According to the present disclosure, the porous coating layer includes a first region that is in contact with the porous polymer substrate and a second region positioned on the opposite side of the first region that is not in contact with the porous polymer substrate.

The binder polymer contained in the first region has a concentration gradient increasing from the porous polymer substrate toward the outermost the porous coating layer.

The slope of concentration gradient of the binder polymer contained in the first region is smaller than the slope of concentration gradient of the binder polymer contained in the second region as described hereinafter, and thus a relatively larger amount of binder polymer is present at the interface between the porous polymer substrate and the porous coating layer. In this manner, it is possible to ensure sufficient adhesion at the interface between the porous polymer substrate and the porous coating layer. For example, the adhesion strength at the interface between the porous coating layer and the porous polymer substrate may be 200 kgf/cm or more.

The adhesion strength at the interface between the porous coating layer and the porous polymer substrate may be determined by fixing a separator on a glass plate with a double-sided tape, attaching a tape to the porous coating layer, and measuring the force required for detaching the tape at 100 mm/min and 90° by using a tensile strength tester. Particularly, the adhesion strength may be determined by fixing a separator on a glass plate with a double-sided tape, attaching a tape (3M transparent tape) firmly to the porous coating layer, and measuring the force required for detaching the tape at 100 mm/min and 90° by using a tensile strength tester.

The binder polymer contained in the second region has a concentration gradient increasing from the porous polymer substrate toward the outermost the porous coating layer. In other words, the binder polymer contained in the second region has a concentration gradient increasing toward the electrode based on the thickness direction of the separator.

In addition, the slope of concentration gradient of the binder polymer contained in the second region is larger than the slope of concentration gradient of the binder polymer contained in the first region. Therefore, the content of the binder polymer is increased at the surface portion, where the porous coating layer faces the electrode, so that the adhesion at the interface between the electrode and the porous coating layer may be increased.

According to an embodiment of the present disclosure, the second region may have a thickness larger than the thickness of the first region so that the required characteristics of the binder polymer may be optimized. For example, the thickness (height) ratio of the first region to the second region may be 4:6-1:9, 4:6-2:8, or 4:6-3:7. For example, the first region may have a thickness of 0.5-10 μm, and the second region may have a thickness of 1-10 μm.

The binder polymer attaches the inorganic particles among themselves and interconnects and fixes them so that the inorganic particles may retain their binding states.

According to an embodiment of the present disclosure, the binder polymer may include polyvinylidene fluoride (PVDF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, acrylonitrile-styrene-butadiene copolymer, polyimide, or two or more of them.

According to an embodiment of the present disclosure, the binder polymer may have a weight average molecular weight of 300,000 or more, 350,000 or more, 400,000 or more, 450,000 or more, or 500,000 or more, and 1,500,000 or less, 1,300,000 or less, or 1,200,000 or less. For example, the binder polymer may have a weight average molecular weight of 450,000-700,000 with a view to ensuring processability in combination with heat resistance and adhesion.

Herein, the weight average molecular weight may be determined by using gel permeation chromatography (GPC) (PL GPC220, Agilent Technologies).

Particularly, the weight average molecular weight may be determined under the following analysis conditions:

Column: PL MiniMixed B×2
Solvent: THF
Flow rate: 0.3 mL/min
Sample concentration: 2.0 mg/mL
Injection amount: 10 μL
Column temperature: 40° C.
Detector: Agilent RI detector
Standard: Polystyrene (corrected with tertiary function)
Data processing: ChemStation According to the present disclosure, the inorganic particles are not particularly limited, as long as they are electrochemically stable. In other words, the inorganic particles are not particularly limited, as long as they cause no oxidation and/or reduction in the operating voltage range (e.g. 0-5 V based on $Li/Li^+$) of an applicable electrochemical device. Particularly, when using inorganic particles having a high dielectric constant, they contribute to an increase in dissociation degree of the electrolyte salt, particularly lithium salt, in a liquid electrolyte, and thus can improve ion conductivity of the electrolyte.

For these reasons, the inorganic particles may include inorganic particles having a dielectric constant of 5 or more, inorganic particles capable of transporting lithium ions or a mixture thereof.

The inorganic particles having a dielectric constant of 5 or more may be any one selected from the group consisting of $Al_2O_3$, $SiO_2$, $ZrO_2$, AlO(OH), $Al(OH)_3$, $TiO_2$, $BaTiO_3$, $Pb(Zr_xTi_{1-x})O_3$ (PZT, wherein 0<x<1), $Pb_{1-x}La_xZr_{1-y}Ti_yO_3$ (PLZT, wherein 0<x<1, 0<y<1), $(1-x)Pb(Mg_{1/3}Nb_{2/3})O_{3-x}PbTiO_3$ (PMN-PT, wherein 0<x<1), hafnia ($HfO_2$), $SrTiO_3$, $SnO_2$, $CeO_2$, MgO, NiO, CaO, ZnO, and SiC, or a mixture of two or more of them.

The inorganic particles capable of transporting lithium ions may be any one selected from the group consisting of lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$-based glass (0<x<4, 0<y<13), lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5), lithium nitride ($Li_xN_y$, 0<x<4, 0<y<2), $SiS_2$-based glass ($Li_xSi_yS_z$, 0<x<3, 0<y<2, 0<z<4) and $P_2S_5$-based glass ($Li_xP_yS_z$, 0<x<3, 0<y<3, 0<z<7), or a mixture of two or more of them.

Although the average particle diameter of the inorganic particles is not particularly limited, the inorganic particles may preferably have an average particle diameter of 0.001-10 μm, more preferably 10 nm to 2 μm, and most preferably 50-150 nm, in order to form a porous coating layer having a uniform thickness and to provide suitable porosity.

The term 'average particle diameter of the inorganic particles' means a $D_{50}$ particle diameter, and '$D_{50}$ particle diameter' means a particle diameter at a point of 50% in the particle number accumulated distribution depending on particle diameter. The particle diameter may be determined by using a laser diffraction method. Particularly, powder to be analyzed is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at a point of 50% of the particle number accumulated distribution depending on particle diameter is calculated to determine $D_{50}$.

According to an embodiment of the present disclosure, the weight ratio of the inorganic particles to the binder polymer may be 90:10-50:50. When the weight ratio of the inorganic particles to the content of the binder polymer satisfies the above-defined range, it is easier to prevent the problem of a decrease in pore size and porosity of the resultant porous coating layer, caused by an increase in content of the binder polymer. It is also easier to solve the problem of degradation of peeling resistance of the resultant porous coating layer, caused by a decrease in content of the binder polymer.

According to an embodiment of the present disclosure, the content of the binder polymer contained in the first region may be the same as the content of the binder polymer contained in the second region. In addition, the weight ratio of the inorganic particles to the binder polymer in the first region may be the same as the weight ratio of the inorganic particles to the binder polymer in the second region.

Herein, the porous coating layer may further include other additives, besides the inorganic particles and the binder polymer.

According to an embodiment of the present disclosure, in the porous coating layer, the inorganic particles are bound to one another by the binder polymer, while the inorganic particles and binder polymer are packed and are in contact with one another, thereby forming interstitial volumes among the inorganic particles, and the interstitial volumes among the inorganic particles become vacant spaces to form pores.

According to an embodiment of the present disclosure, the porous coating layer may have an average pore size of 0.001-10 μm. The average pore size of the porous coating layer may be determined by capillary flow porometry. The capillary flow porometry method measures the smallest pore diameter in the thickness direction. Therefore, in order to determine the average pore size of the porous coating layer alone, it is required to separate the porous coating layer from the porous polymer substrate and to surround the separated porous coating layer with a nonwoven web capable of supporting the porous coating layer. Herein, the nonwoven web should have a pore size significantly larger than the pore size of the porous coating layer.

According to an embodiment of the present disclosure, the porosity of the porous coating layer is not particularly limited. However, the porous coating layer may have a porosity of 35-65%. The porosity of the porous coating layer corresponds to a value obtained by subtracting the volume expressed from the weight and density of each ingredient in the porous coating layer, from the volume calculated from the thickness, width and length of the porous coating layer.

The porosity of the porous coating layer may be determined from scanning electron microscopic (SEM) images, a mercury porosimeter, capillary flow porosimeter, or through the BET 6-point method based on nitrogen gas adsorption flow using a porosimetry analyzer (e.g. Belsorp-II mini, Bell Japan Inc.).

FIG. 1 is a schematic view illustrating the separator according to an embodiment of the present disclosure.

As shown in FIG. 1, the separator 100 according to an embodiment of the present disclosure includes a porous coating layer 40 including a first region 20 and a second region 30, on at least one surface of a porous polymer substrate 10.

The separator according to an embodiment of the present disclosure includes a first region that is in contact with the porous polymer substrate and a second region positioned on the opposite side of the first region that is not in contact with the porous polymer substrate; each of the binder polymer contained in the first region and the second region has a concentration gradient increasing from the porous polymer substrate toward the outermost the porous coating layer; and the concentration gradient of the binder polymer contained in the second region has a larger slope than the slope of the concentration gradient of the binder polymer contained in the first region. In this manner, it is possible to ensure adhesion strength at the interface between the porous polymer substrate and the porous coating layer, while providing increased adhesion between the electrode and the separator.

The separator for an electrochemical device as described above may be interposed between two electrode having opposite polarities and received in a battery casing to provide an electrochemical device.

According to an embodiment of the present disclosure, the porous coating layer may face the positive electrode.

Since the active material used in the positive electrode has lower heat conductivity as compared to the active material used in the negative electrode, the heat conductivity between the positive electrode and the separator may be reduced. Particularly, when the adhesion between the positive electrode and the separator is low, the electrolyte interface layer inserted between the positive electrode and the separator has an increased thickness, resulting in a decrease in heat conductivity by which the heat generated in the cell is discharged to the outside. As a result, the heat conductivity between the positive electrode and the separator is the lowest to cause a so-called bottle neck phenomenon.

Therefore, the effect of the present disclosure may be realized more predominantly, when the porous coating layer faces the positive electrode.

According to an embodiment of the present disclosure, the adhesion between the positive electrode and the separator is increased to enhance the heat conductivity between the positive electrode and the separator in order to solve the above-mentioned problem.

Particularly, according to an embodiment of the present disclosure, the porous coating layer in which the binder polymer is distributed abundantly on the surface facing the electrode is allowed to face the positive electrode. In this manner, it is possible to increase the interfacial cohesion between the porous coating layer and the positive electrode. As a result, it is possible to provide an electrochemical device with significantly improved overcharge safety.

According to an embodiment of the present disclosure, the adhesion strength at the interface between the separator and the positive electrode may be 30 gf/25 mm or more, as determined by heating and pressurizing the separator and the positive electrode at 80° C. under a pressure of 1000 kgf for 1 second, and then applying force at 180° and a rate of 100 mm/min.

For example, the separator and the positive electrode are stacked, and the resultant stack is inserted between PET films having a thickness of 100 μm and adhered by using a flat press at 80° C. under a pressure of 1000 kgf for 1 second. The adhered separator and positive electrode are attached to slide glass by using a double-sided tape. The end portion (10 mm or less from the end of the adhered surface) of the adhered surface of the separator is peeled off and attached to a PET film by using a single-sided tape so that they may be connected in the longitudinal direction. Then, the slide glass is mounted to the lower holder of a UTM instrument, and the PET film adhered to the separator is mounted to the upper holder of the UTM instrument. Then, force is applied at 180° and a rate of 100 mm/min. The force required for separating the positive electrode from the porous coating layer facing the positive electrode is measured. For example, the UTM instrument may be LLOUD Instrument LF Plus.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, the electrochemical device may include lithium secondary batteries, including lithium metal secondary batteries, lithium-ion secondary batteries, lithium polymer secondary batteries or lithium-ion polymer secondary batteries.

The two electrodes, positive electrode and negative electrode, used in combination with the separator according to the present disclosure are not particularly limited, and may be obtained by allowing electrode active materials to be bound to an electrode current collector through a method generally known in the art. Among the electrode active materials, non-limiting examples of a positive electrode active material include conventional positive electrode active materials that may be used for the positive electrodes for conventional electrochemical devices. Particularly, lithium manganese oxides, lithium cobalt oxides, lithium nickel oxides, lithium iron oxides or lithium composite oxides containing a combination thereof may be used preferably.

Non-limiting examples of a negative electrode active material include conventional negative electrode active materials that may be used for the negative electrodes for conventional electrochemical devices. Particularly, lithium-intercalating materials, such as lithium metal or lithium alloys, carbonaceous materials, petroleum coke, activated carbon, graphite or other carbonaceous materials, are used preferably.

Non-limiting examples of a positive electrode current collector include foil made of aluminum, nickel or a combination thereof. Non-limiting examples of a negative electrode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

The separator for an electrochemical device may be obtained by the method as described hereinafter.

In another aspect, there is provided a method for manufacturing a separator for an electrochemical device, including the steps of:

(S1) preparing a composition for forming a first porous coating layer and a composition for forming a second porous coating layer;

(S2) coating and drying the composition for forming a first porous coating layer on at least one surface of the porous polymer substrate; and (S3) coating and drying the composition for forming a second porous coating layer on the product of step (S2), wherein the composition for forming a second porous coating layer is dried at a higher drying rate than the drying rate of composition for forming a first porous coating layer.

First, in step (Si), prepared are a composition for forming a first porous coating layer and a composition for forming a second porous coating layer.

The composition for forming a first porous coating layer is used for forming a first region of the porous coating layer, and the composition for forming a second porous coating layer is used for forming a second region of the porous coating layer.

Each of the composition for forming a first porous coating layer and the composition for forming a second porous coating layer includes inorganic particles, a binder polymer and a solvent, optionally with additives used conventionally in the art.

Reference will be made to the above description about the inorganic particles and binder polymer.

The solvent is not particularly limited, as long as it can disperse the inorganic particles, while allowing dissolution or dispersion of the binder polymer, and can disperse and dissolve the binder polymer. It is advantageous to use a solvent having a low boiling point, since such a solvent may be removed with ease subsequently. Non-limiting examples of the solvent include acetone, tetrahydrofuran, methylene chloride, chloroform, dimethyl formamide, N-methyl-2-pyrrolidone (NMP), cyclohexane, water, or a mixture of two or more of them. The amount of solvent used herein is sufficient to dissolve or disperse the inorganic particles and binder and to provide a viscosity capable of realizing a high thickness uniformity during the subsequent application of the composition for forming a porous coating layer, considering the coating thickness of the composition for forming a porous coating layer and production yield.

In the composition for forming a first or a second porous coating layer, the inorganic particles may be added after they are pulverized in advance to a predetermined average particle diameter. Otherwise, the inorganic particles may be added to the binder solution, and then pulverized and dispersed while controlling them to have a predetermined average particle diameter by using a ball milling process, or the like.

In the composition for forming a first or a second porous coating layer, the inorganic particles may be dispersed by using a method generally known to those skilled in the art. For example, an ultrasonic dispersion device, a ball mill, a bead mill, a disperser, a mixer, or the like may be used. Particularly, ball milling or bead milling processes are preferred. Herein, the dispersion treatment time may vary with the volume of particles, but may be 1-20 hours suitably. In addition, the particle size of the pulverized inorganic particles may be controlled through the size of the beads used for ball milling or bead milling and ball milling (bead milling) time.

In the composition for forming a first or a second porous coating layer, the weight ratio of the inorganic particles to the binder polymer may be 90:10-50:50. When the weight ratio of the inorganic particles to the content of the binder polymer satisfies the above-defined range, it is easier to prevent the problem of a decrease in pore size and porosity of the resultant porous coating layer, caused by an increase in content of the binder polymer. It is also easier to solve the problem of degradation of peeling resistance of the resultant porous coating layer, caused by a decrease in content of the binder polymer.

According to an embodiment of the present disclosure, in step (S1), the first inorganic particles may be added to the first binder solution containing the first binder polymer dissolved in the first solvent and carrying out agitation to prepare a composition for forming a first porous coating layer including the first inorganic particles dispersed therein, and the second inorganic particles may be added to the second binder solution containing the second binder polymer dissolved in the second solvent and carrying out agitation to prepare a composition for forming a second porous coating layer including the second inorganic particles dispersed therein.

According to an embodiment of the present disclosure, the first binder polymer may be the same as the second binder polymer.

According to an embodiment of the present disclosure, the first inorganic particles may be the same as the second inorganic particles.

According to an embodiment of the present disclosure, the first solvent may be the same as the second solvent.

According to an embodiment of the present disclosure, the composition for forming a first porous coating layer may have the same ingredients and the same composition as the composition for forming a second porous coating layer. When preparing the composition for forming a first porous coating layer with the same ingredients and the same composition as the composition for forming a second porous coating layer, i.e. when the composition for forming a first porous coating layer and the composition for forming a second porous coating layer are prepared in a single container, there is an advantage in that a process hassle cause by separate preparation of each of the composition for forming a first porous coating layer and the composition for forming a second porous coating layer can be eliminated.

When preparing the composition for forming a first porous coating layer with the same ingredients and the same composition as the composition for forming a second porous coating layer, it is possible to improve the adhesion between the separator and the electrode depending on processing methods, even when a single type of composition for forming a porous coating layer is used. Therefore, there is an advantage in that it is not necessary to vary the binder content or to prepare two or more types of compositions for forming a porous coating layer in order to increase the adhesion. In other words, according to an embodiment of the present disclosure, it is possible to prepare a porous coating layer having regions with different physical properties by using the same composition for forming a porous coating layer.

In step (S2) and step (S3), the composition for forming a first porous coating layer is coated and dried on a porous polymer substrate, and then the composition for forming a second porous coating layer is coated and dried, with the proviso that the composition for forming a second porous coating layer is dried at a higher drying rate or within a shorter drying time as compared to the composition for forming a first porous coating layer.

The methods for coating the composition for forming a first porous coating layer and the composition for forming a second porous coating layer may be selected from the known methods or may be a new suitable method, considering the properties of the composition for forming a porous coating layer. For example, a method for dispersing the composition uniformly by using a doctor blade may be used, or a die casting or comma coating process may be selected.

According to an embodiment of the present disclosure, a first coating system linked to a unit for supplying a composition for forming a first porous coating layer is provided in order to apply the composition for forming a porous coating layer onto the porous polymer substrate, and a first drying oven is disposed in the downstream of the first coating system. In addition, a second coating system linked to a unit for supplying a composition for forming a second porous coating layer is disposed in the downstream of the first drying oven, and a second drying oven is disposed in the downstream of the second coating system. The porous polymer substrate is conveyed through a conveyer. The composition for forming a first porous coating layer is coated on the porous polymer substrate through the first coating system and dried in the first drying oven to form the first region, and then the composition for forming a second porous coating layer is coated on the first porous coating layer through the second coating system and dried in the second drying oven to form the second region.

Each of the first drying oven and the second drying oven may include a preheating zone, a constant-rate drying zone and a reduced rate-drying zone. The preheating zone is configured to heat the porous coating layer present under room temperature environment to the evaporation temperature of the solvent. The constant-rate drying zone is configured to perform evaporation of the solvent from the surface of the porous coating layer and to reduce the solvent content in the porous coating layer substantially linearly. It is to be understood that the reduced rate-drying zone is typically configured to evaporate the solvent mildly in the fine pores among the particles forming the porous coating layer.

The present disclosure is characterized in that the drying rate of the composition for forming a first porous coating layer in the constant-rate drying zone is different from the drying rate of the composition for forming a second porous coating layer in the constant-rate drying zone. This is because binder migration occurs actively in the constant-rate drying zone.

According to the present disclosure, the composition for forming a first porous coating layer and the composition for forming a second porous coating layer are dried under the same conditions of temperature, humidity and atmosphere. It is to be understood that the solvent contained in the composition for forming a porous coating layer is substantially completely dried after carrying out the constant-rate drying.

According to an embodiment of the present disclosure, the rate of drying the solvent per unit time may be controlled by varying the speed passing through the drying oven, particularly, constant-rate drying zone, with the same length between the composition for forming a first porous coating layer and the composition for forming a second porous coating layer.

For example, it is possible to control the amount of the solvent dried per unit time by setting the time required for the composition for forming a first porous coating layer to pass through the drying oven, particularly, constant-rate drying zone, to be longer than (e.g. 2-3 times longer than) the time required for the composition for forming a second porous coating layer to pass through the drying oven, particularly, constant-rate drying zone. For example, when the drying oven configured to dry the composition for forming a porous coating layer has a length of 10 m, the composition for forming a first porous coating layer is allowed to pass through the 10 m drying oven for 10 minutes so that it may be dried, while the composition for forming a second porous coating layer is allowed to pass through the 10 m drying oven for 5 minutes by increasing the amount of heat or hot air in the drying oven so that it may be dried within 5 minutes. In this manner, it is possible to vary the amount of solvent dried per unit time.

For example, in the constant-rate drying zone, the composition for forming a first porous coating layer and the composition for forming a second porous coating layer may be conveyed at a rate of 0.1 m/min to 10 m/min, with the proviso that the conveying rate of the composition for forming a second porous coating layer is higher than the conveying rate of the composition for forming a first porous coating layer.

In this case, the size and number of the drying oven are not particularly limited but may be varied depending on the size of the inorganic particles to be prepared, ingredients of the composition for forming a porous coating layer, coating amount of the composition for forming a porous coating layer, or the like. For example, a drying system may be designed by providing 2-10 drying ovens with a length of 10-15 m as a constant-rate drying zone, and 1 drying oven with a length of 10-15 m as a reduced-rate drying zone.

Each of the first drying oven and the second drying oven may be set independently to 50° C. or higher, or 80° C. or higher, and 110° C. or lower, to inhibit peeling or collapse of the porous coating layer and to improve the productivity.

The solvent evaporation rate (drying rate) may be adjusted by the pressure of atmosphere (pressure in the drying oven), drying temperature and relative humidity. In general, a lower pressure of atmosphere and/or a higher drying temperature tends to provide a higher drying rate, when the other conditions are the same.

The drying rate in the reduced-rate drying zone may be set to 1 mg/sec or more (typically 1.5 mg/sec or more, preferably 2 mg/sec or more) advantageously, with a view to completion of reduced-rate drying within a short time. In addition, the drying rate in the reduced-rate drying zone may be set to 5 mg/sec or less (typically 3 mg/sec or less, preferably 2.8 mg/sec or less) advantageously, with a view to prevention of oxidation of the surface of the porous polymer substrate.

According to an embodiment of the present disclosure, each of the drying rate of the composition for forming a first porous coating layer and the drying rate of the composition for forming a second porous coating layer may be set in such a manner that the amount of solvent dried per second may be 1-50 mg/sec, with the proviso that the drying rate of the composition for forming a second porous coating layer is higher than the drying rate of the composition for forming a first porous coating layer.

For example, the composition for forming a second porous coating layer may be dried at a higher drying rate than the drying rate of the composition for forming a first porous coating layer by 1-20 mg/sec, or the drying rate of the composition for forming a first porous coating layer may be controlled in such a manner that it may be 10-50% of the drying rate of the composition for forming a second porous coating layer.

Herein, it is to be understood that each of the drying rate of the composition for forming a first porous coating layer and the drying rate of the composition for forming a second porous coating layer means the corresponding drying rate in the constant-rate drying zone.

When the drying rates are set as described above, the binder polymer contained in the composition for forming a second porous coating layer is migrated more actively toward the upper layer portion during the drying of the composition for forming a second porous coating layer, as compared to the migration of the binder polymer contained in the composition for forming a first porous coating layer toward the upper layer portion during the drying of the composition for forming a first porous coating layer. As a result, in the finished separator, the porous coating layer portion of the surface facing the electrode has an increased binder polymer distribution.

In other words, a first region and a second region are formed, wherein each of the binder polymer contained in the first region and the second region has a concentration gradient increasing toward the electrode based on the thickness direction of the separator, and the concentration gradient of the binder polymer contained in the second region has a larger slope than the slope of the concentration gradient of the binder polymer contained in the first region.

As the binder polymer distribution is increased in the porous coating layer portion of the surface facing the electrode, the adhesion between the separator and the electrode is increased. When the adhesion between the separator and the electrode is increased, the heat resistance between the separator and the electrode is reduced, and thus it is possible to provide a separator for an electrochemical device with improved overcharge safety, and an electrochemical device including the same.

In addition, a sufficient amount of binder polymer is present also at the side of the porous polymer substrate to provide sufficient adhesion between the porous polymer substrate and the porous coating layer.

Meanwhile, the pressure of atmosphere in the drying oven in which the composition for forming a first porous coating layer is dried may be the same as the pressure of atmosphere in the drying oven in which the composition for forming a second porous coating layer is dried. For example, the pressure of atmosphere may be 1 atm.

In addition, the drying oven in which each of the composition for forming a first porous coating layer and the composition for forming a second porous coating layer is dried may be maintained at a dew point of −10° C. or lower.

The drying operation in each of the first drying oven and the second drying oven mentioned above may be carried out in the conventional manner known to those skilled in the art, for example, by using hot air.

According to an embodiment of the present disclosure, even though the composition for forming a first porous coating layer and the composition for forming a second porous coating layer have the same ingredients and composition and include the same starting materials, it is possible to provide an electrochemical device with improved adhesion between an electrode, particularly, a positive electrode, and the porous coating layer. This is because the drying rate of the composition for forming a second porous coating layer is controlled to be higher than the drying rate of the composition for forming a first porous coating layer so that the migration of the binder polymer occurring in the second region may be enhanced to increase the binder distribution on the surface where the porous coating layer faces the electrode, as can be seen from FIG. 2 and FIG. 3.

Figure 2:
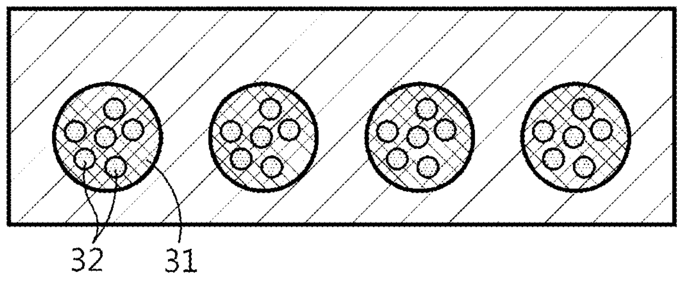
FIG. 2 and FIG. 3 are schematic views illustrating a change in distribution of a binder polymer in a porous coating layer depending on drying rate.
Figure 3:
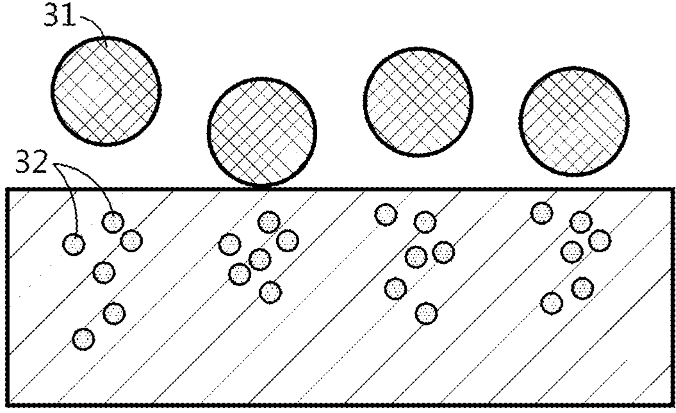

FIG. 2 and FIG. 3 are schematic views illustrating a change in distribution of a binder polymer in a porous coating layer depending on drying rate.

As shown in FIG. 2, the second binder polymer 32 is dissolved or dispersed in the second solvent 31. As shown in FIG. 3, when drying the coating composition, the second binder polymer 32 is migrated toward the surface where the porous coating layer faces the electrode, while the second solvent 31 is evaporated. In this manner, it is possible to improve the adhesion between the porous coating layer and the positive electrode.

MODE FOR DISCLOSURE

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

Polyvinylidene fluoride (PVDF) having a weight average molecular weight of 330,000 as a first binder polymer was introduced to acetone as a first solvent and dissolved therein at 50° C. for about 4 hours to prepare a first binder solution. Next, $Al_2O_3$ (particle size: 100 nm) was introduced as first inorganic particles to the first binder solution. Herein, the weight ratio of the first inorganic particles to first binder polymer was controlled to 80:20 to prepare a composition for forming a first porous coating layer. Herein, the solid content (slurry free from the solvent) was 18 parts by weight based on 100 parts by weight of the composition for forming a first porous coating layer.

Then, polyvinylidene fluoride (PVDF) having a weight average molecular weight of 330,000 was introduced as a second binder polymer to acetone as a second solvent and dissolved therein at 50° C. for about 4 hours to prepare a second binder solution. Next, $Al_2O_3$ (particle size: 100 nm) was introduced as second inorganic particles to the second binder solution. Herein, the weight ratio of the second inorganic particles to second binder polymer was controlled to 80:20 to prepare a composition for forming a second porous coating layer. Herein, the solid content (slurry free from the solvent) was 18 parts by weight based on 100 parts by weight of the composition for forming a second porous coating layer.

After that, the composition for forming a first porous coating layer was applied to both surfaces of a polyethylene porous film (porosity: 45%) having a thickness of 9 μm through a dip coating process at 110° C. under a relative humidity of 45%. Then, the composition for forming a first porous coating layer was dried at a rate of 16 mg/sec to form a first region of porous coating layer having a thickness of 0.9 μm on each surface.

Then, the composition for forming a second porous coating layer was applied to each surface of the first region through a dip coating process at a rate of 5 m/min and 110° C. under a relative humidity of 45%. Then, the composition for forming a second porous coating layer was dried at a rate of 32 mg/sec to form a second region of the porous coating layer having a thickness of 2.1 μm on each surface. Herein, the thickness ratio of the first region to the second region was 3:7 on each surface. The results are shown in the following Table 1.

Comparative Example 1

Polyvinylidene fluoride (PVDF) having a weight average molecular weight of 330,000 as a binder polymer was introduced to acetone as a solvent and dissolved therein at 50° C. for about 4 hours to prepare a binder solution. Next, $Al_2O_3$ (particle size: 100 nm) was introduced as inorganic particles to the binder solution. Herein, the weight ratio of the inorganic particles to binder polymer was controlled to 80:20 to prepare a composition for forming a porous coating layer. Herein, the solid content (slurry free from the solvent) was 18 parts by weight based on 100 parts by weight of the composition for forming a porous coating layer.

Next, the composition for forming a porous coating layer was applied to both surfaces of a polyethylene porous film (porosity: 45%) having a thickness of 9 μm through a dip coating process at 110° C. under a relative humidity of 45%. Then, the composition for forming a porous coating layer was dried at a rate of 16 mg/sec to form a porous coating layer having a thickness of 3 μm on each surface. The results are shown in the following Table 1.

Comparative Example 2

A separator for an electrochemical device was obtained in the same manner as Comparative Example 1, except that the composition for forming a porous coating layer was dried at a rate controlled to 32 mg/sec. The results are shown in the following Table 1.

Comparative Example 3

A separator for an electrochemical device was obtained in the same manner as Example 1, except that the composition for forming a first porous coating layer was dried at a rate controlled to 32 mg/sec, and the composition for forming a second porous coating layer was dried at a rate controlled to 16 mg/sec. The results are shown in the following Table 1.

Test Examples: Analysis of Physical Properties of Separators

In each of the separators for electrochemical devices according to Examples 1 and Comparative Examples 1-3, the thickness ratio of the first region to the second region, adhesion between the positive electrode and the separator, overcharge safety and $T_{max}$ were determined. The results are shown in the following Table 1.

TABLE 1

| | Drying rate | | | | | |
|---|---|---|---|---|---|---|
| | Composition for forming first porous coating layer | Composition for forming second porous coating layer | Thickness ratio of first region to second region | Adhesion between positive electrode and separator (kgf/25 mm) | Overcharge safety test (5 test specimens) | $T_{max}$ |
| Ex. 1 | 16 mg/sec | 32 mg/sec | 3:7 | 54.3 | 4/5 | 53.4° C. |
| Comp. Ex. 1 | 16 mg/sec | | — | 20.1 | 0/5 | ignition |
| Comp. Ex. 2 | 32 mg/sec | | — | Non-dried portion is generated due to excessively high drying rate | | |
| Comp. Ex. 3 | 32 mg/sec | 16 mg/sec | 3:7 | 22.2 | 0/5 | ignition |

As can be seen from Table 1, in the case of Example 1 wherein the drying rate of the composition for forming a second porous coating layer is higher than the drying rate of the composition for forming a first porous coating layer, four of the five test specimens pass the overcharge safety test.

On the contrary, in the case of Comparative Example 1, migration of the binder polymer toward the surface facing the electrode is reduced due to the slow drying rate. Therefore, Comparative Example 1 provides low adhesion between the positive electrode and the separator. As a result, all of the five test specimens cannot pass the overcharge safety test.

In the case of Comparative Example 2, the composition for forming a porous coating layer is dried at the same rate as the composition for forming a second porous coating layer in Example 1. However, in the case of Comparative Example 2, all of the solvent is dried at once, unlike Example 1, and thus a non-dried portion is generated due to the excessively high drying rate and coating rate.

Meanwhile, in the case of Comparative Example 3, the drying rate of the composition for forming a first porous coating layer is higher than the drying rate of the composition for forming a second porous coating layer. In this case, the content of the binder polymer migrated toward the surface of the porous coating layer is relatively smaller as compared to Example 1, and thus adhesion between the positive electrode and the porous coating layer is not improved relatively. As a result, it can be seen that all of the five test specimens cannot pass the overcharge safety test.

The thickness of each separator, adhesion between the positive electrode and the separator, overcharge safety test and $T_{max}$ were determined or carried out as follows.

1) Determination of Thickness

The thickness of each of the first region and the second region was determined by using a thickness gauge (VL-50S-B, available from Mitutoyo Co.).

2) Determination of Adhesion (Lami Strength) between Positive Electrode and Separator To determine the adhesion (Lami strength) between a positive electrode and a separator, the positive electrode was prepared as follows.

First, $LiNi_{0.6}Co_{0.2}Mn_{0.2}O_2$ as a positive electrode active material, carbon black and polyvinylidene fluoride (PVDF) were mixed at a weight ratio of 96:2:2, and the resultant mixture was introduced to and mixed with N-methyl-2-pyrrolidone (NMP) to prepare positive electrode slurry. The resultant positive electrode slurry was coated on aluminum foil (thickness: 20 μm) to a capacity of 3 mAh/g to obtain a positive electrode.

The resultant positive electrode was cut into a size of 20 mm×50 mm. Each of the separators according to Example 1 and Comparative Examples 1-3 was cut into a size of 25 mm×100 mm. The prepared separator was stacked with the positive electrode, and the resultant stack was inserted between PET films having a thickness of 100 μm and adhered by using a flat press. Herein, the flat press was heated and pressurized at 80° C. under a pressure of 1000 kgf for 1 second. The adhered separator and positive electrode were attached to slide glass by using a double-sided tape. The end portion (10 mm or less from the end of the adhered surface) of the adhered surface of the separator was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 180° and a rate of 100 mm/min. The force required for separating the positive electrode from the porous coating layer facing the positive electrode was measured.

3) Overcharge Safety Test

A cell charged fully to 0.3 C/4.2 V was prepared to carry out the overcharge test. The overcharge test was carried out by determining whether explosion occurs or not, when the cell was charged at a current of 1 C to 8.4 V at room temperature.

4) Determination of $T_{max}$

A thermocouple was attached to the center of each cell during the overcharge test. The highest temperature of the temperature values measured until the overcharge test was finished was defined as $T_{max}$.

Test Example 2: Determination of Peel Strength Along Thickness Direction of Separator Each of the separators according to Example 1 and Comparative Examples 1 and 3 was determined in terms of peel strength along the thickness direction of the separator. The results are shown in the following Table 2.

The peel strength along the thickness direction of the separator was determined as follows.

Each of the separators according to Example 1 and Comparative Examples 1 and 3 was cut into a size of 25 mm×100 mm. The prepared separator was attached to slide glass by using a double-sided tape. The end portion (10 mm or less from the end of the adhered surface) of the adhered surface of the separator, not attached to the slide glass, was peeled off and attached to a 25 mm×100 mm PET film by using a single-sided tape so that they might be connected in the longitudinal direction. Then, the slide glass was mounted to the lower holder of a UTM instrument (LLOYD Instrument LF Plus), and the PET film adhered to the separator was mounted to the upper holder of the UTM instrument. Then, force was applied at 90° and a rate of 100 mm/min. The force required for separating the porous coating layer partially was measured.

Next, a PET film was attached to the separator from which the porous coating layer was peeled partially, and force was applied at 90° and a rate of 100 mm/min. The force required for separating the porous coating layer partially was measured.

The above procedure was further carried out twice.

TABLE 2

| | Peel strength of first run (kgf/cm) | Peel strength of second run (kgf/cm) | Peel strength of third run (kgf/cm) | Peel strength of fourth run (kgf/cm) |
|---|---|---|---|---|
| Ex. 1 | 67.3 | 34.1 | 40.3 | 44.3 |
| Comp. Ex. 1 | 39.2 | 44.1 | 44.8 | 48.1 |
| Comp. Ex. 3 | 32.8 | 58.2 | 39.0 | 35.5 |

As can be seen from Table 2, in the case of Example 1, the highest peel strength appears at the first run. It is thought that this is because the drying rate of the composition for forming a second porous coating layer is higher than the drying rate of the composition for forming a first porous coating layer, and thus a larger amount of binder polymer is distributed on the surface facing the electrode. At the second to the fourth runs, it is after the porous coating layer on the surface facing the electrode is peeled partially, and thus lower peel strength values appear as compared to the first run.

On the contrary, in the case of Comparative Example 1, the separator provides similar peel strength values from the first run to the fourth run. In the case of Comparative Example 1, the separator drying rate is excessively low, and thus distribution of the binder polymer is not changed significantly along the thickness direction of the separator, and the separator shows similar peel strength values from the first run to the fourth run.

In the case of Comparative Example 3, the highest peel strength appears at the second run. It is thought that this is because the drying rate of the composition for forming a first porous coating layer is higher than the drying rate of the composition for forming a second porous coating layer, and thus a larger amount of binder polymer is distributed at the interface between the second region and the first region.

What is claimed is:

1. A separator for an electrochemical device, comprising:
   - a porous polymer substrate; and
   - a porous coating layer on at least one surface of the porous polymer substrate, wherein the porous coating layer comprises inorganic particles and a binder polymer,
   - wherein the porous coating layer comprises a first region that is in contact with the porous polymer substrate and a second region on an opposite side of the first region that is not in contact with the porous polymer substrate,
   - wherein the binder polymer present in the first region has a concentration gradient increasing from the porous polymer substrate toward an outermost surface of the porous coating layer,
   - wherein the binder polymer present in the second region has a concentration gradient increasing from the porous polymer substrate toward the outermost surface of the porous coating layer,
   - wherein the concentration gradient of the binder polymer present in the second region has a larger slope than a slope of the concentration gradient of the binder polymer present in the first region, and
   - wherein a weight ratio of the inorganic particles to the binder polymer in each of the first region and the second region is 90:10 to 50:50.

2. The separator for the electrochemical device according to claim 1, wherein a ratio of a thickness of the first region to a thickness of the second region is 4:6 to 1:9.

3. The separator for the electrochemical device according to claim 1, wherein an amount of the binder polymer present in the first region is the same as an amount of the binder polymer present in the second region.

4. The separator for the electrochemical device according to claim 1, wherein the binder polymer comprises at least one of polyvinylidene fluoride (PVDF), polyvinylidene fluoride-co-hexafluoropropylene, polyvinylidene fluoride-co-trichloroethylene, polymethyl methacrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinylalcohol, cyanoethyl cellulose, cyanoethyl sucrose, pullulan, carboxymethyl cellulose, acrylonitrile-styrene-butadiene copolymer, or polyimide.

5. An electrochemical device, comprising:
   - an electrode assembly in a battery casing comprising a positive electrode and a negative electrode; and
   - a separator interposed between the positive electrode and the negative electrode, wherein the separator is the separator for an electrochemical device as defined in claim 1.

6. The electrochemical device according to claim 5, wherein the porous coating layer faces the positive electrode.

7. The electrochemical device according to claim 6, having an adhesion strength of 30 gf/25 mm or more at an interface between the separator and the positive electrode, wherein the adhesion strength is measured by heating and pressurizing the separator and the positive electrode at 80° C. under a pressure of 1000 kgf for 1 second, and then applying force at 180° and a rate of 100 mm/min.

* * * * *